United States Patent [19]

Yen et al.

[11] Patent Number: 4,960,008

[45] Date of Patent: Oct. 2, 1990

[54] AUTOMOTIVE TRANSMISSION LINKAGE SYSTEM

[76] Inventors: Frank Y. Yen, 3913 Anvil Dr., Troy, Mich. 48083; David D. Ardayfio, 25230 Concourse, Southfield, Mich. 48075

[21] Appl. No.: 214,031

[22] Filed: Jun. 30, 1988

[51] Int. Cl.⁵ .............................................. B60K 20/02
[52] U.S. Cl. ..................................... 74/473 R; 73/117; 74/335
[58] Field of Search ................. 74/335, 473 R; 73/117

[56] References Cited

U.S. PATENT DOCUMENTS

| | | | |
|---|---|---|---|
| 1,458,421 | 6/1923 | Kesling | 74/483 PB |
| 2,219,323 | 10/1940 | Kliesrath | 74/336.5 |
| 3,516,287 | 6/1970 | Masuda et al. | 74/335 |
| 3,687,248 | 8/1972 | Holub | 74/483 PB |
| 3,713,332 | 1/1973 | Herrbrich | 73/117 |
| 4,466,279 | 8/1984 | Gable et al. | 73/117 |
| 4,790,177 | 12/1988 | King et al. | 73/117 |
| 4,817,468 | 4/1989 | Leigh-Monstevens et al. | 74/335 |

FOREIGN PATENT DOCUMENTS

| | | | |
|---|---|---|---|
| 2528920 | 1/1977 | Fed. Rep. of Germany | 73/117 |
| 56-107145 | 8/1981 | Japan | 73/117 |
| 61-41044 | 2/1986 | Japan | 74/473 R |
| 1019259 | 5/1983 | U.S.S.R. | 73/117 |

Primary Examiner—Leslie A. Braun
Assistant Examiner—Scott Anchell
Attorney, Agent, or Firm—Weintraub, DuRoss & Brady

[57] ABSTRACT

The new automatic-manual transmission system includes all of the components of a standard transmission including a conventional gearshift lever and a clutch pedal. In addition, the system includes a gearshift position-selection panel is located apart from the gearshift lever. The panel enables the driver to select the desired gear position of the gearshift lever by manipulating the panel without the necessity of handling the gearshift lever. Also, included is a controller which transforms the driver's gearshift selection to an output signal which corresponds to the gearshift position selected by the driver. The system also includes a linkage means for mechanically repositioning the gearshift lever automatically in accordance with the output signal. The linkage includes two motors, two driving links each pivotally engaged with the motor, a coupler attached to one of the driving links, and a gripper link which is secured to the gearshift lever. The gripper link is slidably attached to a driving link and pivotally attached to the coupler.

21 Claims, 3 Drawing Sheets

AUTOMOTIVE TRANSMISSION LINKAGE SYSTEM

BACKGROUND OF THE INVENTION

1. Field of the Invention

The invention relates to a robotic gear-change mechanism for vehicular manual transmissions.

2. Background Art

It has been estimated that a manual transmission consumes about four miles per gallon less gasoline than the equivalent size automatic transmission. With the decreasing availability of natural fuels, there is an urgent need to conserve energy. It is estimated that billions of gallons of precious fuel can be saved each year if the original equipment in new cars were manual transmissions instead of automatic transmissions. Also, the United States government has become increasingly involved in the fuel consumption of automobile engines sold by car manufacturers. Car manufacturers are required to produce energy-efficient automobile to be in compliance with government restrictions.

Numerous selection devices have been employed to activate and change the operative condition of automotive transmission systems, particularly manual transmissions.

U.S. Pat. No. 1,329,798 discloses a push-button gear shift mechanism in which the gears are neutralized by depressing the clutch pedal and the selective shifting of the transmission gears is achieved by pushing the appropriate button.

U.S. Pat. No. 1,363,719 discloses a push-button safety interlocking device for a gear shift mechanism for automatically preventing the actuation of the gear shift mechanism which operates to limit the movement of the clutch pedal through four solenoids except under predetermined conditions.

U.S. Pat. No. 1,458,421 discloses a push-button shift for a transmission having a selective control capability in which the depression of the clutch in conjunction with a push-button mounted on the steering column and flexible cables connected to the transmission shifting apparatus causes a gear shift change.

U.S. Pat. No. 3,687,248 is an automatic gear shift actuation mechanism which uses push-buttons in synchronism with engagement of the clutch release by employing solenoids to shift the transmission.

Manually-operated dry clutch multi-speed transmissions burn considerably less fuel than automatic transmissions, and when properly used, such transmissions last longer and require less maintenance than automatic transmissions. However, manual transmissions are cumbersome to operate. To initiate forward motion from a stopped position, the driver must periodically reposition the gearshift lever into numerous different positions depending upon the speed of the vehicle, and with each shift the driver must at the same time depress a clutch pedal.

SUMMARY OF THE INVENTION

The primary advantage of the present invention is that it enables drivers to enjoy the fuel economy and the more efficient mechanical operation of the manual transmission systems, while at the same time simulate the convenience and ease of operation of an automatic transmission.

The invention employs a programmable controller which actuates a robotic-type linkage to automatically operate the gearshift lever of a manual transmission upon selection by the driver of the various gearshift positions.

The principles of the present invention may be utilized in three separate ways. First, the present invention may be used as a kit to convert three-speed, four-speed, and five-speed manual transmissions to operate from a gear position selection panel rather than requiring the driver to manually repositioning the gearshift lever. Second, the present invention may be easily integrated into the transmission systems built by the vehicle manufacturer. Third, a variation of the design can be used by handicapped drivers who have difficulty in shifting either the automatic console or the shift lever built into the steering column of automatic transmissions.

The new automatic-manual transmission system includes all of the components of a standard transmission, including a conventional gearshift lever and a clutch pedal. In addition, the system includes a gearshift position-selection panel which is located apart from the gearshift lever. The panel enables the driver to select the desired gear position of the gearshift lever by manipulating the panel without the necessity of the driver handling the gearshift lever.

The system also includes a programmable controller, a solenoid to operate automatically the clutch pedal, and a linkage means, preferably a robotic actuator. The controller transforms the driver's gearshift selection to an output signal The robotic actuator mechanically repositions the gearshift lever automatically in accordance with the output signal. The linkage includes two servomotors, two driving links each pivotally engaged with the motor, a coupler attached to one of the driving links, and a gripper link which is secured to the gearshift lever. The gripper link is slidably attached to a driving link and pivotally attached to the coupler.

For a more complete understanding of the automatic-manual transmission system and the linkage of the present invention, reference is made to the following detailed description and accompanying drawings in which the presently preferred embodiment of the invention is illustrated by way of example. It is expressly understood, however, that the drawings are for purposes of illustration and description only, and are not intended as a definition of the limits of the invention. Throughout the following description and drawings, identical reference numbers refer to the same component throughout the several views.

DETAILED DESCRIPTION OF THE INVENTION

Figure 1:
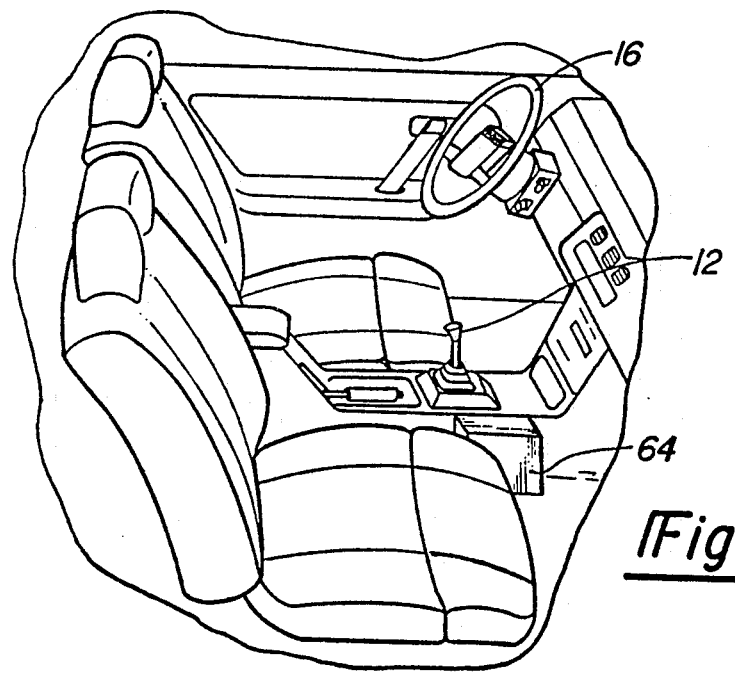
FIG. 1 is a perspective view of the preferred embodiment showing a conversion kit for the automatic-manual transmission of the present invention mounted adjacent to a conventional manual transmission of an vehicle.
Figure 2:
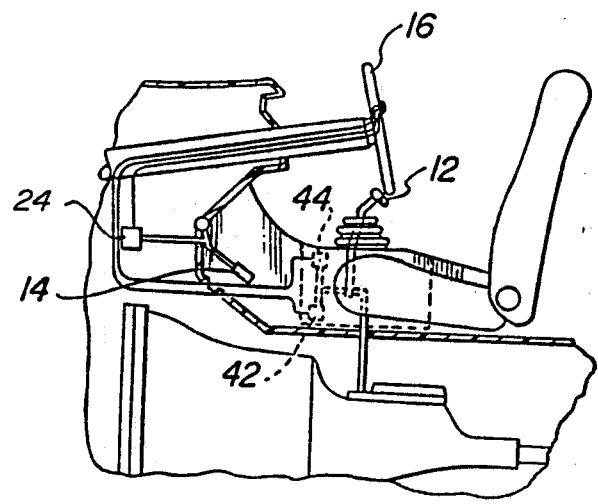
FIG. 2 is a partial sectional view of the embodiment shown in FIG. 1 showing the steering column, the push-button selection panel, the clutch pedal and the solenoid, the two servomotors and the gearbox, and the gearshift lever of the automatic-manual transmission.

Referring now to the drawings, FIG. 1 is a perspective view showing the automatic-manual transmission system 10 of the present invention installed as a conversion kit located adjacent to a conventional gearshift lever 12 of a manual transmission of an vehicle. FIG. 2 shows a sectional view of the conversion kit within the vehicle.

The new automatic-manual transmission system 10 includes all of the components of a standard transmission including a conventional gearshift lever 12 and a clutch pedal 14. In addition, the system includes a gearshift position-selection panel 20 which is located apart from the gearshift lever 12. The panel 20 enables the driver to select the desired gear position of the gearshift lever 12 by manipulating the panel 20 without the necessity of the driver handling the gearshift lever 12. Any one of a variety of devices may be used to enable the driver to make a selection, such as a mechanical push-button, an electrical push-button, a rotary-type switch, etc.

The system also includes a controller 60, which is preferably programmable, and a linkage means 40, which is preferably a robotic actuator. The programmable controller 60 and the robotic actuator 40 along with the servomotors 42 and 44 that drive the actuator 40 are located within a compartment which is mounted adjacent to the gearbox 64. The controller 60 is commercially available from Master International Inc., Model AMT101, or an equivalent contains an algorithm which compares the new gearshift position selected by the driver with the present position, and converts it to a predefined path for the gearshift lever 12.

The present invention may be used as a kit to convert three-speed, four-speed, and five-speed manual transmissions to operate from a gearshift position selection panel 20 rather than requiring the driver to manually reposition the gearshift lever 12, or the system may easily be integrated into the transmission systems built by the vehicle manufacturer. The robotic actuator 40, the servomotors 42 and 44, and the controller 60 are mounted within the gearbox 64. The selection panel 20 is mounted in the steering wheel 16 and an engage/disengage switch 70 is mounted on the gearbox 64, so that the driver may choose to drive the vehicle in either the manual mode, or in the automatic manual mode.

Figure 3:
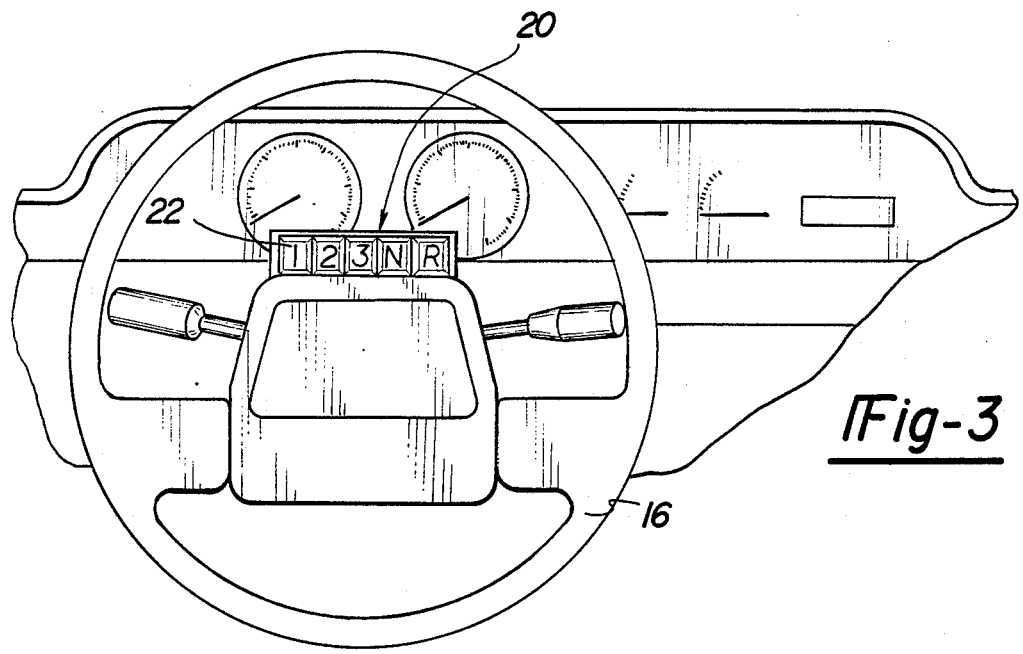
FIG. 3 is another perspective view of the push-button selection panel for the automatic-manual transmission mounted on the steering wheel.

The selection of a new gearshift position by the driver closes a circuit which triggers the controller 60 to read the new position of the selection panel 20 to determine which gearshift position has been selected. FIG. 3 shows how the selection panel 20 may be mounted onto the steering wheel 16. The controller 60 transforms the driver's gearshift selection to an output signal which corresponds to the position of the gearshift lever 12 selected by the driver. The output signal is sent to the robotic actuator 40 which mechanically repositions the gearshift lever 12 automatically in accordance with the output signal.

The programmable controller 60 activates a solenoid 24 which is in electrical connection with the clutch pedal 14, during the repositioning of the gearshift lever 12. Upon selecting a new position for the gearshift lever 12, the clutch pedal 14 is engaged, the gearshift lever 12 is repositioned, and once the gearshift lever 12 has reached its final position the clutch pedal 14 is disengaged.

The parallelogram linkage 45 includes two driving means 42 and 44 which are preferably conventional servomotors, a first driving link 46 and a second driving link 48, a coupler 50, and a gripper link 52. The first driving link 46 is driven by the first servomotor 42, and the first end of the first link 46 being pivotally attached to a fixed point 49 within the vehicle. The second driving link 48 is driven by the second servomotor 44, and the first end of the second link 48 is pivotally attached to a fixed point within the vehicle, also depicted as 49. The first end of the coupler 50 is pivotally attached to the second driving link 48 and the second end of the coupler 50 is pivotally attached to the gripper link 52.

The first end of the gripper link 52 is pivotally attached to the coupler 50, and the second end of the ripper link 52 is secured to the gearshift lever 12. The second end of the first driving link 46 is pivotally attached internally to the gripper link 52, so that the position of the first and second driving links 46 and 48 determines one and only one position of the gearshift lever 12. By pinning the first driving link 46 internally to the gripper link 52, the gripper link 52 acts as a lever to apply force and reposition the gearshift lever 12, and the force necessary to reposition the gearshift lever 12 is minimized. Hence, when the two motors 42 and 44 drive the two driving links 46 and 48, respectively to their respective predetermined positions dictated by the selection made by the driver, the linkage 45 will move the gearshift lever 12 into the appropriate gearshift position.

Figure 4:
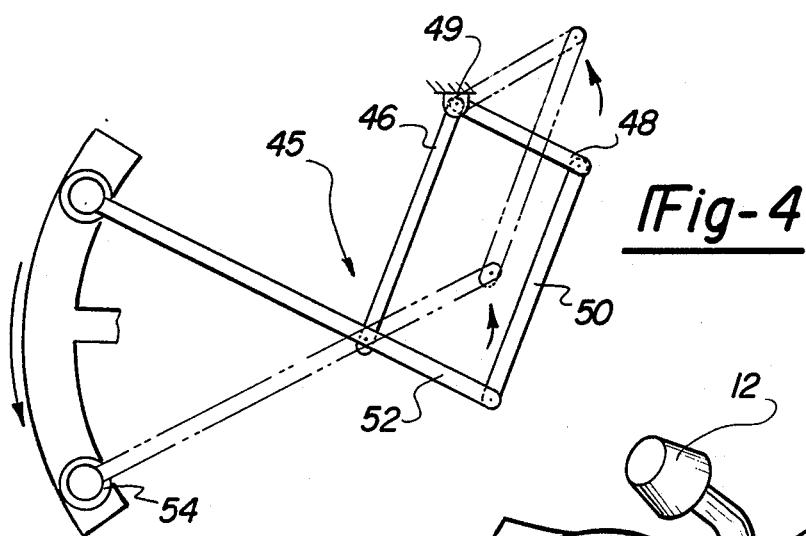
FIG. 4 depicts the parallelogram linkage of the automatic-manual transmission system showing the movement of the linkage to reposition the gearshift lever from "first gear" to "second gear"
Figure 6:
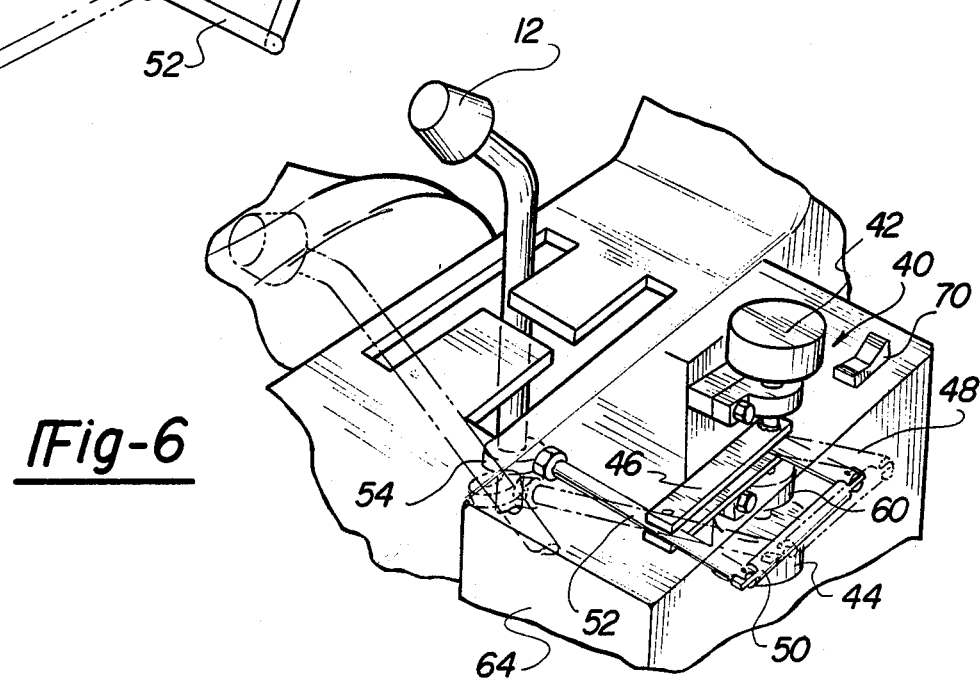
FIG. 6 is a perspective view of the linkage mechanism of FIG. 4.
Figure 5:
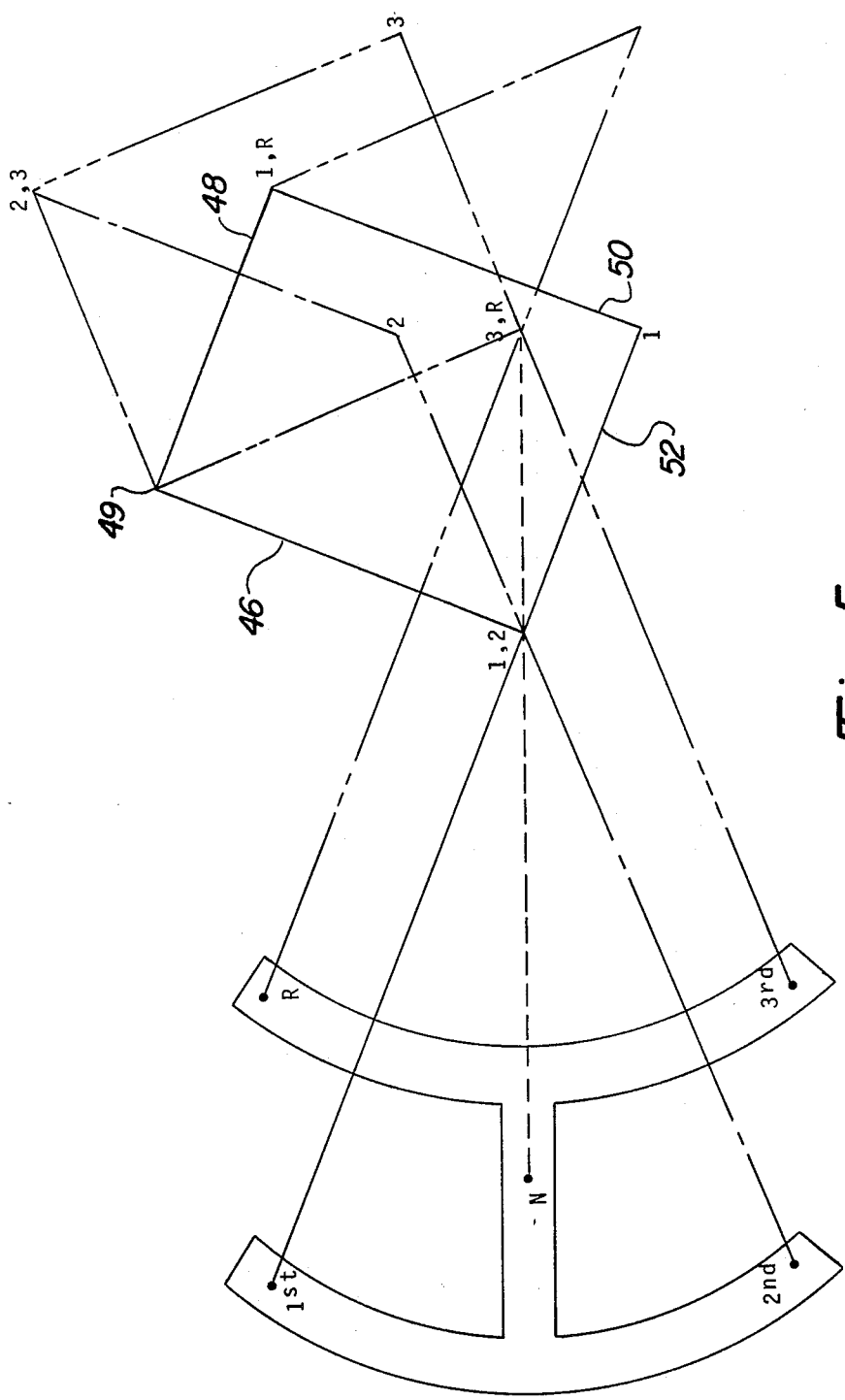
FIG. 5 is another depiction of the parallelogram linkage system shown in FIG. 4, showing the position of each of the links in each position of a standard three-speed manual transmission.

In the parallelogram linkage 45 shown in FIGS. 4 and 5, the first driving link 46 is parallel to the coupler 50, and the second driving link 48 is parallel to the gripper link 52. FIGS. 4 and 6 depict the parallelogram linkage 45 showing the movement of linkage 45 to reposition the gearshift lever 12 from the "first gear" position to the "second gear" position. FIG. 5 depicts the parallelogram linkage system 45 of FIG. 4, showing the position of each of the links in each position of a standard three-speed manual transmission.

In the console 68 depicted in FIG. 6, neutral gear extends all along the connecting bar of the "H-shaped" console, so that, for example, when the driver shifts between first and second gear, the transmission passes through an intermediate neutral gear position. Also, the gripper link 52 depicted in FIG. 6 is shown secured to the base of the gearshift lever 12. In another embodiment (not shown), the gearbox 64 may extend above the gearshift lever 12 so that the gripper link 52 is secured to the top of the gearshift lever 12. This provides better leverage for shifting, but the design interferes somewhat with the view of the gearshift console 68.

In changing back and forth between first and second gear, the position of the first driving link 46 is held stationary, and only the position of the second driving link 48 is changed. When either the third gear or reverse gear positions are selected, the position of the first driving link 46 is changed as shown in FIG. 5. The controller 60 may be programmed so as not to allow certain shift changes that may damage the transmission, and also alert the driver of the error via a warning signal, such as from third gear to reverse gear.

The parallelogram linkage 45 is driven by two servomotors 42 and 44. An arm or handle 54 is attached to the gearshift lever 12 and through the operation of the motors causes the linkage 45 to move the gearshift lever 12 through the various gear positions. The gripper link 52 is secured to the gearshift lever 12 within the gearbox 64. The clutch pedal 14 is automatically engaged and disengaged during the repositioning of the gearshift lever 12 by means of a standard solenoid 24. The same parallelogram linkage 45 may be used for a four-speed or five-speed transmission, requiring only an increased number of positions for the driving links 46 and 48 and a different programmable controller 60.

Figure 1A:
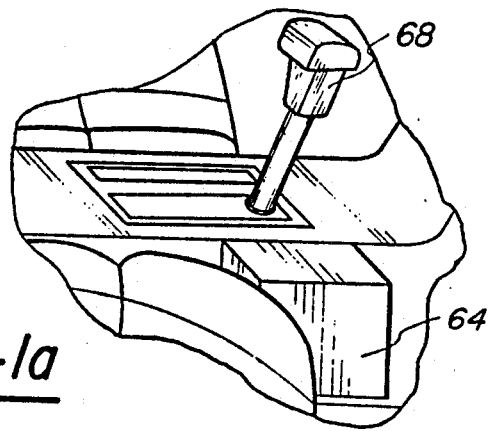
FIG. 1A is a perspective view of another embodiment of the conversion kit of the present invention for handicapped drivers, with the gear box adjacent to a conventional console on an automatic transmission of a vehicle.

A simple variation of the present invention enables handicapped drivers who have difficulty in shifting gears in an automatic transmission to do so by merely depressing push-buttons 22 mounted on the steering wheel 16. The system may be employed with either a sport-style automatic console 68 as shown in FIG. 1A, or the shift lever built into the steering column (not shown).

The system includes a conventional means for shifting an automatic transmission system, a push-button position-selection panel 20, a controller 60, and a robotic actuator 40. The panel 20 is located apart from the automatic shift 68, the panel 20 enabling the driver to select the desired drive mode for the vehicle by depressing a button 22 on the panel 20 without the necessity of the driver handling the automatic shift 68. The controller 60 transforms the driver's shift position selection to an output signal, wherein the signal corresponds to the position selected by the driver. The robotic actuator 40 mechanically repositions the automatic shift in accordance with the output signal. Of course, handicapped drivers may also use the automatic-manual transmission system 10 already described, but it is believed that a push-button automatic transmission is preferred for such persons because of the requirement to minimize the amount of shifting required to operate the vehicle.

While the invention has been described in conjunction with a specific embodiment, it is evident that many alternatives, modifications, and variations will be apparent to those skilled in the art in light of the disclosure herein. It is intended that all such alternatives, modifications, and variations are included herein that fall within the spirit and scope of the appended claims.

What is claimed is:

1. A system for converting a manual multi-speed transmission to operate as an automatic-manual transmission, the system being disposed within a vehicle, the transmission having a conventional gearshift lever and a clutch pedal, the system comprising:
    (a) a gearshift position selection panel, the panel being located apart from the gearshift lever, the panel enabling a driver to select the desired gear position of the gearshift lever by manipulating the panel without the necessity of the driver handling the gearshift lever;
    (b) a controller which transforms the gearshift selection of the driver to an output signal, the signal corresponding to the gearshift position selected by the driver; and
    (c) actuating means for mechanically repositioning the gearshift lever automatically in accordance with the output signal.

2. The system of claim 1, further comprising: (d) means for automatically engaging and disengaging the clutch pedal during the repositioning of the gearshift lever.

3. The system of claim 2, wherein the automatic engaging and disengaging means for engaging and disengaging the clutch pedal is a solenoid coil.

4. The system of claim 1, wherein the actuating means is a robotic linkage mechanism.

5. The system of claim 4, wherein the robotic linkage mechanism is powered by a servomotor.

6. The system of claim 1, wherein the controller is programmable.

7. The system of claim 1, further comprising:
    (d) means for disconnecting and reconnecting the actuating means so that a first driver may drive the vehicle in a manual mode, and a second driver may drive the vehicle in the automatic-manual mode.

8. A manual-automatic transmission system disposed within a vehicle, the system comprising:
    (a) a gearshift lever;
    (b) a gearshift position-selection panel, the panel being located apart from the gearshift lever, the panel enabling a driver to select the desired gear position of the gearshift lever by manipulating the panel without the necessity of the driver handling the gearshift lever;
    (c) a controller which transforms the gearshift selection of the driver to an output signal, the signal corresponding to the gearshift position selected by the driver; and
    (d) actuating means for mechanically repositioning the gearshift lever automatically in accordance with the output signal.

9. The system of claim 8, further comprising:
    (e) means for automatically engaging and disengaging the clutch pedal during the repositioning of the gearshift lever.

10. The system of claim 9, wherein the automatic engaging and disengaging means for engaging and disengaging the clutch pedal is a solenoid coil.

11. The system of claim 8, wherein the actuating means is a robotic linkage mechanism.

12. The system of claim 11, wherein the robotic linkage mechanism is powered by a servomotor.

13. The system of claim 8, wherein the controller is programmable.

14. The system of claim 8, further comprising:
    (e) means for disconnecting and reconnecting the actuating means so that a first driver may drive the vehicle in a manual mode, and a second driver may drive the vehicle in the automatic-manual mode.

15. A system for converting a conventional transmission in a vehicle for use by handicapped drivers, the system being disposed inside the vehicle, the system comprising:
    (a) a conventional means for shifting a transmission system;
    (b) a push-button position-selection panel, the panel being located apart from the shifting means, the panel enabling the driver to select the desired drive mode for the vehicle by depressing a button on the panel without the necessity of the driver handling the shifting means;

(c) a controller which transforms the drive mode selection to an output signal, the signal corresponding to the mode selected by the driver; and
(d) actuating means for mechanically repositioning the shifting mean automatically in accordance with the output signal.

16. The system of claim 15, wherein the acutating means is a robotic linkage mechanism.

17. The system of claim 16, wherein the robotic linkage mechanism is powered by a servomotor.

18. The system of claim 15, wherein the controller is programmable.

19. The system of claim 15, further comprising:
(e) means for disconnecting and reconnecting the actuating means so that a handicapped driver may drive the vehicle by using the selection panel, and a non-handicapped driver may drive the vehicle by shifting gear positions without the selection panel.

20. A linkage for automatically actuating the gearshift lever in a standard vehicular transmission in response to a gearshift selection of a driver to a predetermined position, the linkage comprising:
(a) a first driving means;
(b) a first driving link being actuateable by the first driving means, the first end of the first driving link being pivotally attached to a point;
(c) a second driving means;
(d) a second driving link having two ends, the second driving link being actuateable by the second driving means, a first end of the second driving link being pivotally attached to the point;
(e) a elongated coupler link having two ends, the first end of the coupler being pivotally attached to the second end of the second driving link; and
(f) an elongated gripper link having two ends, the first end of the gripper link being pivotally attached to the second end of the coupler, the second end of the first driving link being pivotally pinned to the gripper link, and the second end of the gripper link being secured to the gearshift lever, the gripper link being cooperatively engaged with the second end of the first link, the gripper link acting as a lever;
whereby actuation of the first driving link by the first driving means into a first driving link position and actuation of the second driving link by the second driving means into a second driving link position based upon the gearshift selection made by the driver determines the predetermined position of the gearshift lever, the predetermined position of the gearshift lever being unique for the first driving link position and the second driving link position.

21. The linkage of claim 20, wherein the length of the coupler is essentially equal to the length of the first driving link, the first and second driving means being disposed on the same axis.

* * * * *